United States Patent
De Brigard

(10) Patent No.: US 12,241,437 B1
(45) Date of Patent: Mar. 4, 2025

(54) BARBELL WITH ROTATING HAND

(71) Applicant: Ricardo De Brigard, Davie, FL (US)

(72) Inventor: Ricardo De Brigard, Davie, FL (US)

( * ) Notice: Subject to any disclaimer, the term of this patent is extended or adjusted under 35 U.S.C. 154(b) by 25 days.

(21) Appl. No.: 18/140,451

(22) Filed: Apr. 27, 2023

(51) Int. Cl.
*F16K 17/04* (2006.01)
*F02M 35/10* (2006.01)
*F16K 15/03* (2006.01)

(52) U.S. Cl.
CPC ..... *F02M 35/10255* (2013.01); *F16K 15/033* (2013.01); *F16K 17/0413* (2013.01)

(58) Field of Classification Search
CPC ............... F16K 15/033; F16K 17/0413; F16K 17/0446; F16K 17/0493; F16K 17/164; F16K 24/06; F16K 27/0227; F16K 27/0232; F16K 37/0041; F02M 35/10255
See application file for complete search history.

(56) References Cited

U.S. PATENT DOCUMENTS

| | | | | |
|---|---|---|---|---|
| 2,744,539 | A * | 5/1956 | Jones | F16K 15/033 |
| | | | | 137/527.4 |
| 6,152,173 | A * | 11/2000 | Makowan | F16K 15/03 |
| | | | | 137/553 |
| 6,510,832 | B2 | 1/2003 | Maurer et al. | |
| 8,662,119 | B2 * | 3/2014 | Burris | B67D 7/52 |
| | | | | 141/311 A |
| 10,253,894 | B2 * | 4/2019 | Wada | F16K 27/0227 |
| 11,466,648 | B1 | 10/2022 | Ricketts | |

FOREIGN PATENT DOCUMENTS

| | | | | |
|---|---|---|---|---|
| CN | 109058530 A | * | 12/2018 | |
| CN | 113864491 A | * | 12/2021 | |
| CN | 115059784 A | * | 9/2022 | |
| DE | 3838547 A1 | * | 5/1990 | |
| EP | 1672258 A1 | * | 6/2006 | ........... F16K 15/033 |
| EP | 2738365 A1 | * | 6/2014 | ........... F01N 3/2066 |

OTHER PUBLICATIONS

Machine English translation of CN-109058530-A (Year: 2024).*
Machine English translation of CN-113864491-A (Year: 2024).*
Machine English translation of DE-3838547-A1 (Year: 2024).*
Machine English translation of EP-1672258-A1 (Year: 2024).*
Machine English translation of EP-2738365-A1 (Year: 2024).*
Machine English translation of CN-115059784-A (Year: 2024).*

* cited by examiner

*Primary Examiner* — Hailey K. Do
(74) *Attorney, Agent, or Firm* — Sanchelima & Associates, P.A.; Jesus Sanchelima; Christian Sanchelima

(57) ABSTRACT

A barbell with rotating hand grip including a frame assembly, a cover assembly, and a pivot assembly. The frame assembly includes a frame that is coupled at the uppermost side of the engine air filter housing, wherein the frame includes an opening that becomes the intake of said housing. The frame includes knuckles that are adapted to receive a cap, wherein said cap is coupled into said knuckles by means of a pin, allowing the cap to be opened and closed by a spring-loaded mechanism. The cap is opened by means of the air intake pressure of the engine of a vehicle to prevent water from entering inside the engine, thereby the cap when opened activates an alarm to notify the user when water is inside the engine air filter housing.

12 Claims, 5 Drawing Sheets

US 12,241,437 B1

BARBELL WITH ROTATING HAND

BACKGROUND OF THE INVENTION

1. Field of the Invention

The present invention relates to a barbell and, more particularly, to a barbell with rotating hand that includes a frame placed on the uppermost side of an engine air filter housing that includes a spring-loaded mechanism creating an air sealed intake that prevent water from entering to the engine and is opened by the suction pressure when required.

2. Description of the Related Art

Several designs for barbells with rotating hands have been designed in the past. None of them, however, include a spring-loaded mechanism placed on an uppermost side of the engine air filter housing which includes a frame and pivoting cover that creates a seal when abutting against the frame and it is opened by means of the pressure applied when the air intake system of the engine suctions air for the combustion.

Applicant believes that a related reference corresponds to U.S. Pat. No. 6,510,832 issued for controllable air intake system for an internal combustion engine and control process therefor. Applicant believes that another related reference corresponds to U.S. Pat. No. 11,466,648 issued for water ingestion control system for vehicle, water ingestion and evacuation system for vehicle, vehicle including same, and method. None of these references, however, teach of a spring-loaded relief valve for the intake of an internal combustion engine, where the valve is controlled by water detecting sensors.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device that prevents water from entering the engine when driving through a puddle.

It is another object of this invention to provide a device that includes a regulated spring switch that is opened when the engine requires air for the combustion.

It is still another object of the present invention to provide a device that alarms the vehicle and user when it opens and closes.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
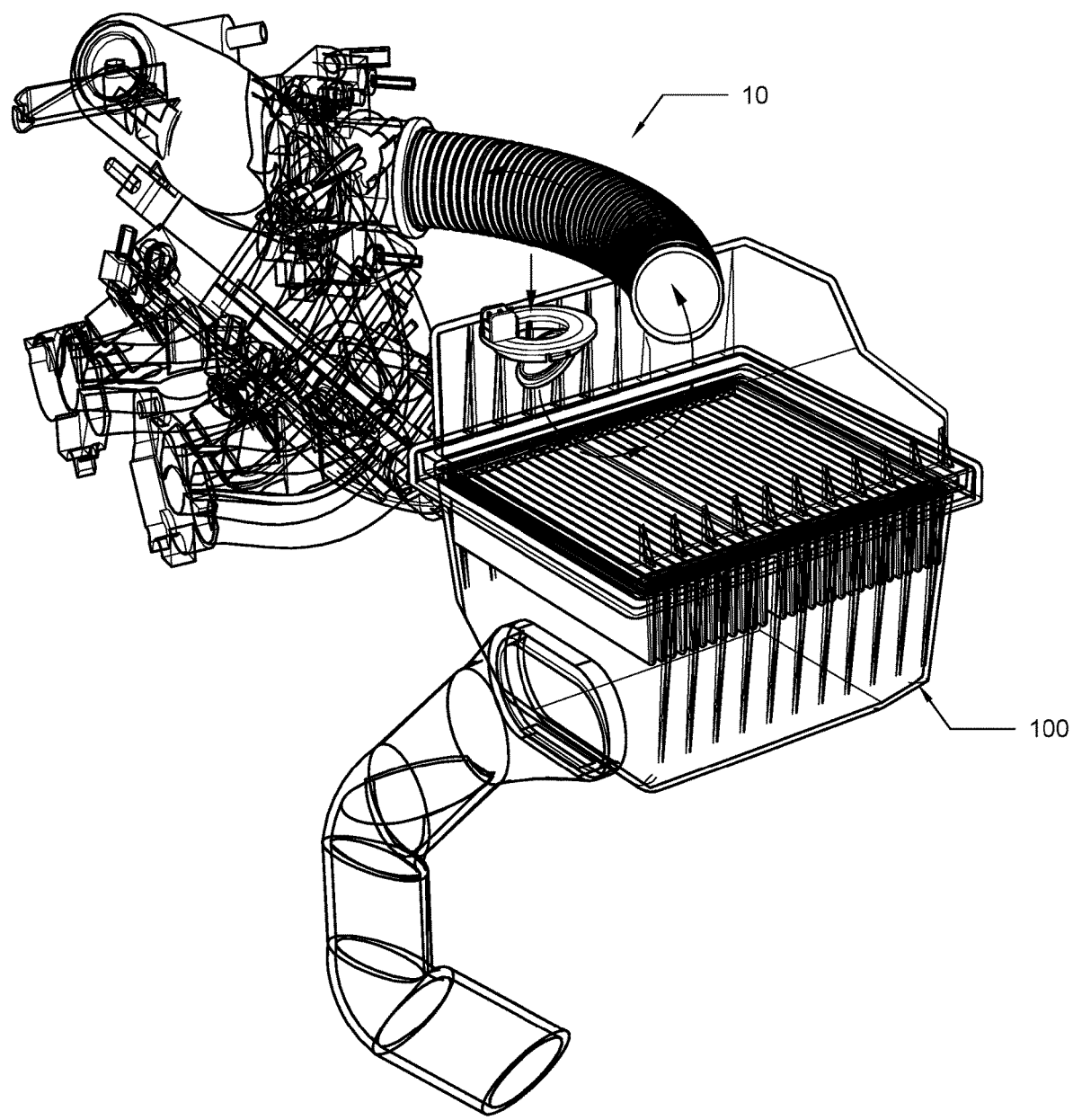
FIG. 1 represents an operational view of an exemplary embodiment of the present invention 10 placed on top of an engine air filter housing 100.

Referring now to the drawings, where the present invention is generally referred to with numeral 10, it can be observed that it basically includes a frame assembly 20, a cover assembly 40, a pivot assembly 60 and various exemplary embodiments (100, 101) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
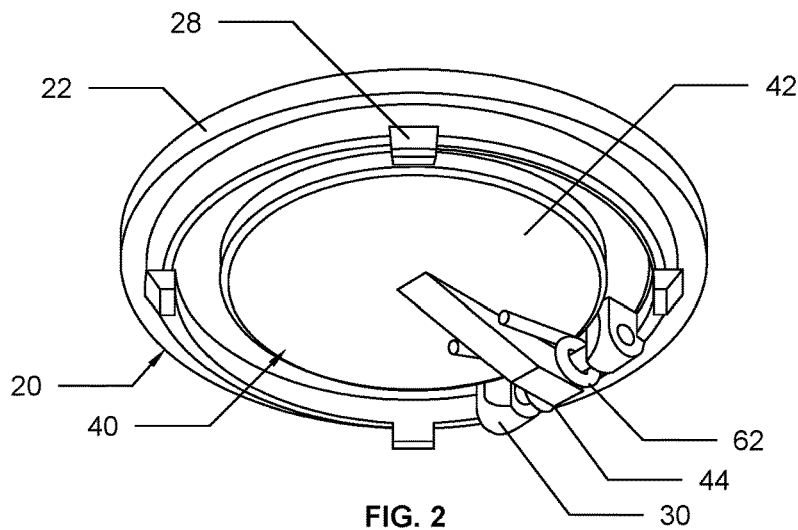
FIG. 2 shows a perspective bottom view of the present invention 10 in a closed configuration, wherein the cap 42 abuts against a portion of the frame 22 by means of the spring 62 coupled into the support 44 creating thereby a seal.
Figure 3:
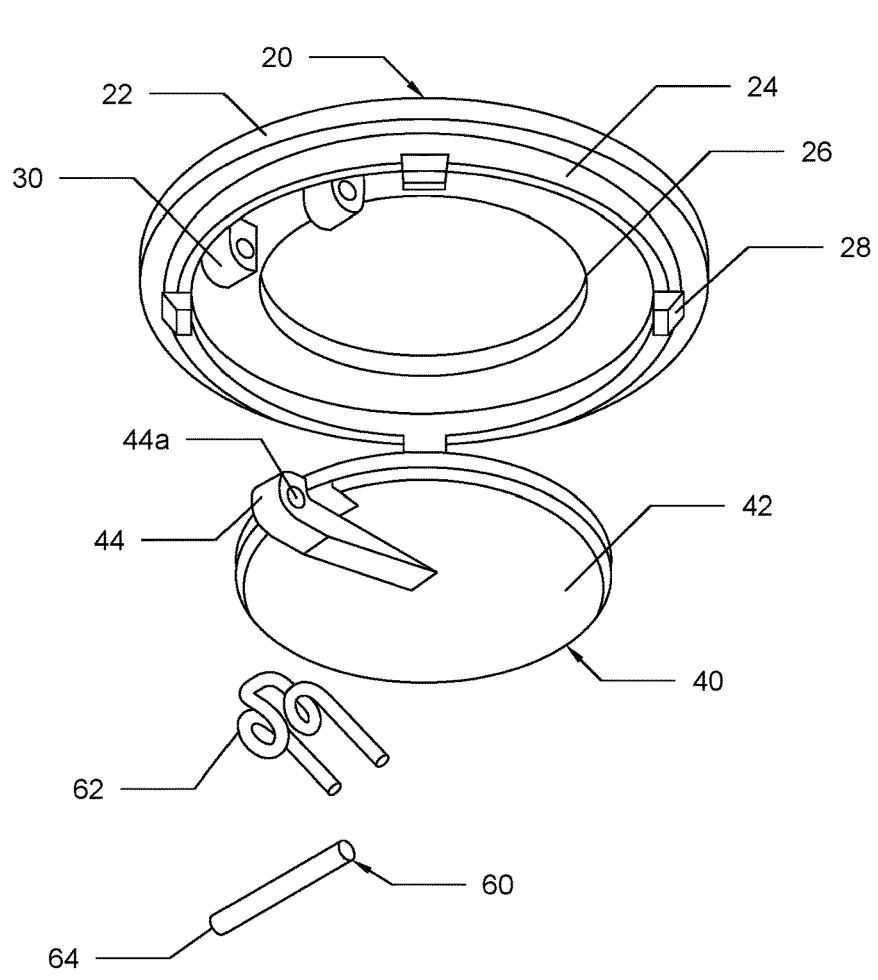
FIG. 3 illustrates an exploded view of the present invention 10, wherein the support opening 44a is concentrically placed between the openings of the knuckles 30 thereby the pin 64 is placed therein to secure in place the cap 42 with respect to the bottom side of the frame 22.
Figure 4:
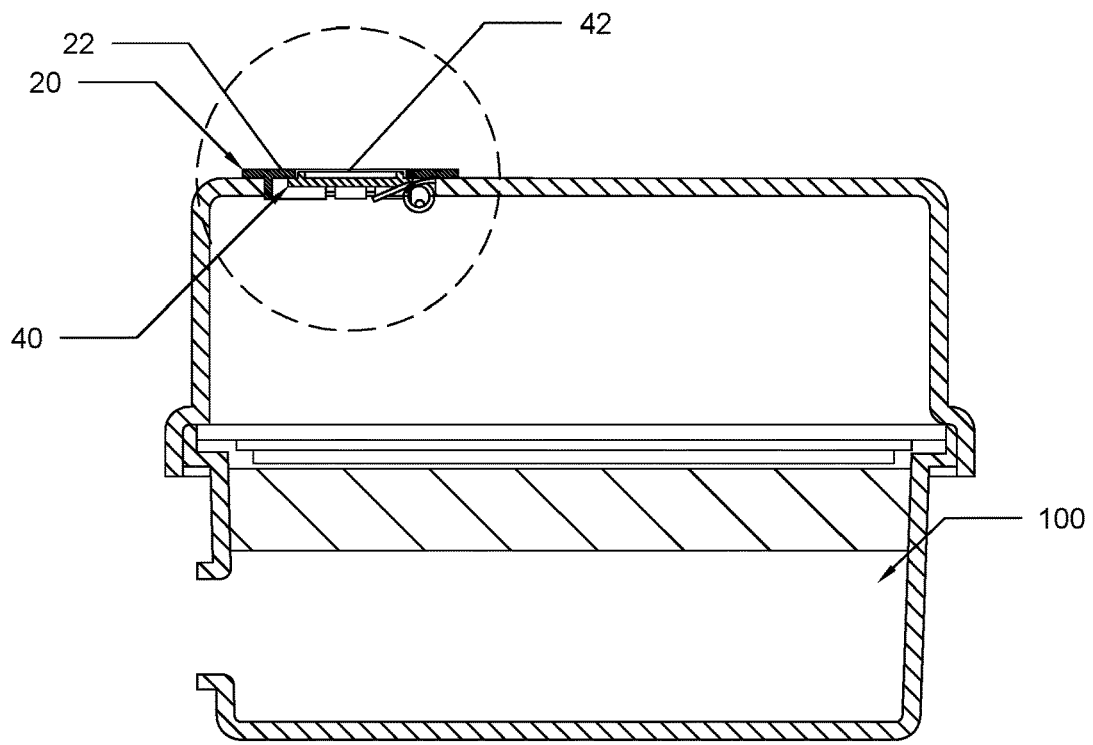
FIG. 4 is a representation of a cross-section view of the engine air filter housing 100 with the present invention 10 coupled.
Figure 5:
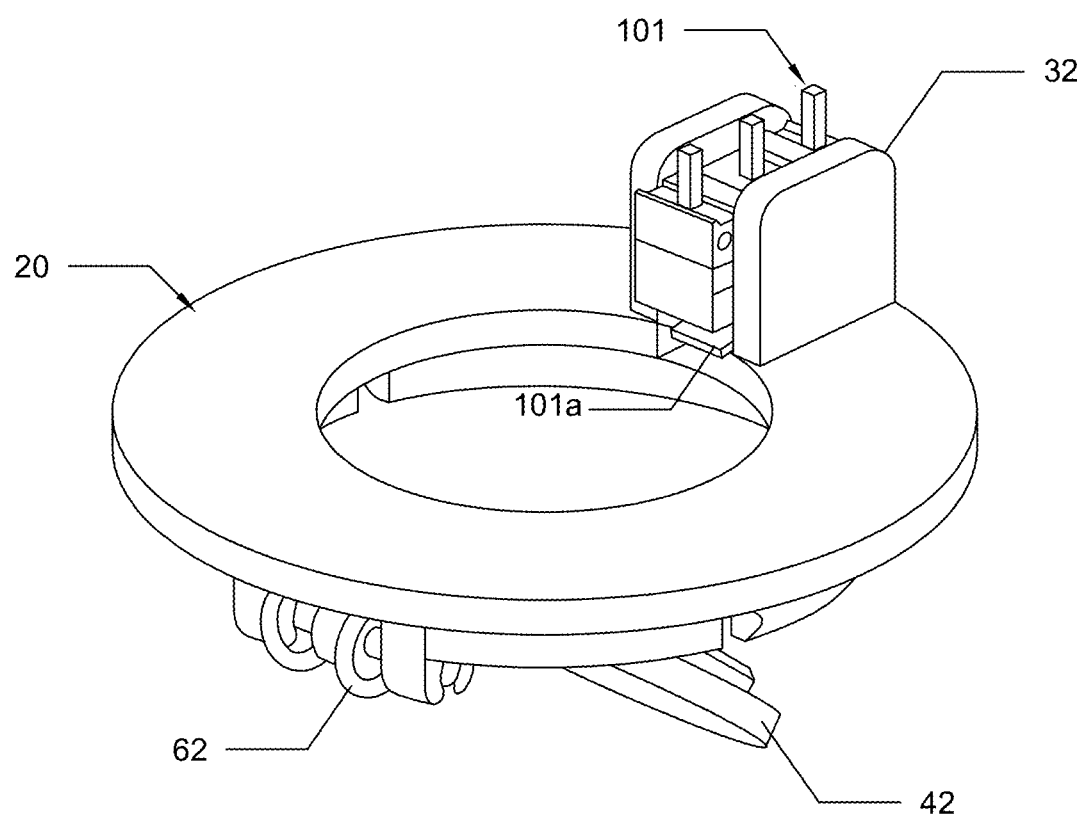
FIG. 5 demonstrates an isometric view of the cover assembly 40 when coupled with the frame assembly 20, wherein the cap 42 is in an open configuration the frame 22 includes top supports 32 to hold a microswitch 101.

Frame assembly 20 includes a frame 22, an extended portion 24, an opening 26, stoppers 28, knuckles 30 and top supports 32. In an exemplary embodiment, the frame 22 may be a rounded element made of a hard plastic material that is placed at the uppermost edge of the engine air filter housing 101. As FIG. 4 illustrates. The bottom side of the frame 22 may be placed onto a flat surface of the engine air filter housing 101, wherein the coupling therebetween may prevent leakage of air. Nonetheless, it should be considered that the frame 22 and the engine air filter housing 100 may be integrally formed, wherein the intake of the engine air filter housing 100 may be covered. In a suitable embodiment, the frame may include an opening in a central area thereof, wherein said opening 26 creates an intake that allows the air to flow through the interior of the engine air filter housing 100. As best depicted in FIG. 5. In a preferred embodiment, the frame 22 includes the extended portion 24 in a bottom side thereof, wherein the extended portion 24 creates a peripheral wall support for the stoppers 28 and the knuckles 30. As best depicted in FIG. 2. It should be considered that the frame 22 the extended portion 24, the stoppers 28, the knuckles 30, and the top supports 32 are integrally formed therebetween. In one embodiment, the stoppers 28 may be placed around the extended portion 24 wherein the internal side thereof may conform with the curved internal wall of the extended portion. As FIG. 1 depicts. The stoppers 28 may have a trapezoid shape, a rectangular shape, a square shape, or any other regular or regular shape. In other embodiment, the knuckles 30 may be joints with openings configured to receive the pivot assembly 60, wherein the knuckles are placed in a bottom side of the frame 22 and parallel with respect to the extended portion 24. As FIG. 3 represents. In a suitable embodiment, the top supports 32 may be perpendicular walls that extend past the top side of the frame 22, wherein the top supports 32 may include a gap therebetween that is configured to hold a microswitch 101 or any other suitable switch. As best illustrated in FIG. 5. In a suitable variation the frame 22 may be rectangular, oval, square or any other suitable shape, wherein the elements integrally formed with the frame 22 may be configured to conform with the shape thereof.

Cover assembly 40 includes a cap 42, a support 44, and a support opening 44a. In an exemplary embodiment, the cap 42 may have a rounded shape with a bigger diameter with respect to the opening 26 and may have smaller diameter with respect with the extended portion 24, thereby the cap 42 may abut against a portion of the bottom side of the frame. As FIG. 2 shows. It should be considered that the cap 42 may be made of a hard plastic material with a suitable surface that allows the cap 42 to create a seal when abutting against the frame 22. In a suitable variation, the cap 42 and the frame 22 may include a rubber portion or any other suitable material embedded onto the frame 22 and the cap 42 that provides an improved seal when abutting therebetween, preventing water, dust, or any other external debris from entering through the interior of the engine filter housing 100. In a preferred embodiment, the support 44 may be an extended portion integrally formed with the cap 42 that extend past the center thereof towards the periphery, wherein the support 44 includes in an edge thereof a support opening 44a that is configured to receive the pivot assembly 60, thereby said edge may have a width smaller with respect to the gap of the knuckles 30 where said edge of the support further includes an opening concentrically placed with respect to the openings of the knuckles 30. The support 42 may include a transitional slanted section that extends towards a central portion of the cap 42. As FIG. 3 illustrates.

Pivot assembly 60 includes a spring 62 and a pin 64. In an exemplary embodiment, the spring 62 may include horizontal bars with a transitional loop or transitional spiral on each bar that joins into a perpendicular section, creating a spring-loaded mechanism, as FIG. 3 represents, wherein the pin 64 is configured to be inserted into the transitional spiral and further inserted through the support opening 44a and the openings of the knuckles 30, thereby the horizontal bars abuts against the bottom side of the cap 42 and the perpendicular section of the spring 62 abuts against the bottom side of the frame 22, wherein the cap 42 may be opened downward and returns to its original position by means of spring 62. As FIG. 5 depicts. In a suitable embodiment the pin 64 may have a suitable length where the edges thereof may be parallel or extend past the external sides of the knuckles, thereby providing a fastener to secure in place the spring 62 and the cap 42 into the knuckles 30. As FIG. 2 represents.

Figure 4A:
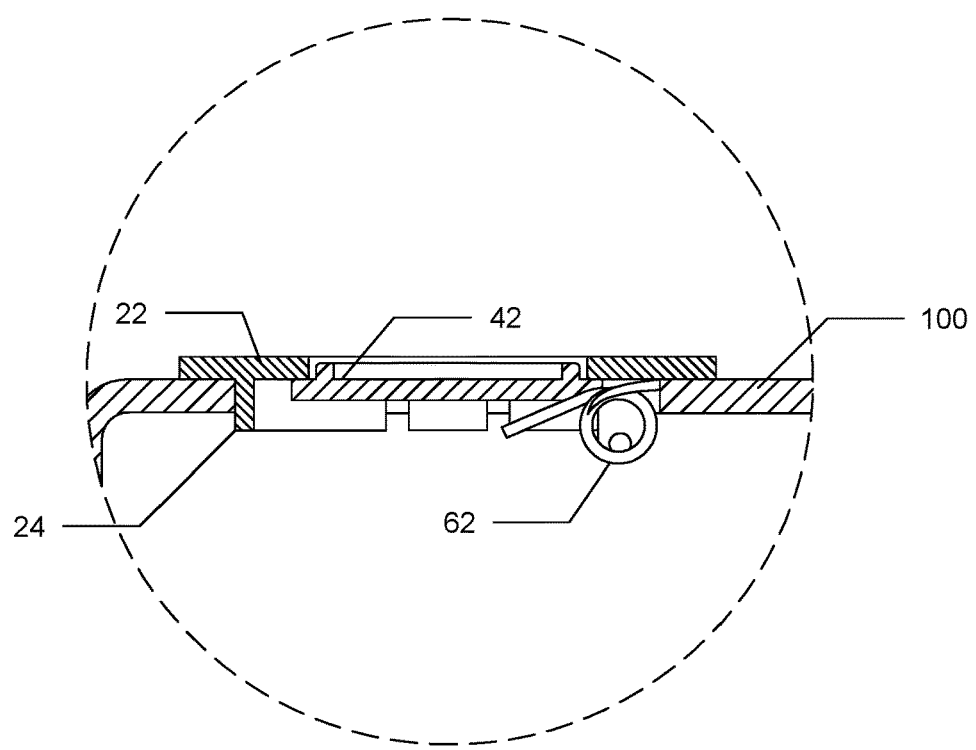
FIG. 4A depicts a detailed view of FIG. 4 wherein the cap 42 covers the opening 26 of the frame 22 by means of the spring 62.

Referring to the figures, and more particularly to FIG. 4A, the cap 42 when closed creates a hermetic seal against water or any other liquid or solid substance, thereby the spring 62 allows to open the cap 42 by means of a suction pressure of the air intake system of the engine and the cap 42 may be closed automatically by the spring 62. Referring to FIG. 5, the lever 101a or actuator of the microswitch 101 may be in contact with the cap 42, thereby the cap 42 may release the lever 101a of the microswitch 101 when the cap is opened, allowing and audible alarm or sound to alarm the user when the cap is opened, and the audible alarm may stop when the cap 42 actuates the lever 101a of the microswitch 101.

Figure 6:
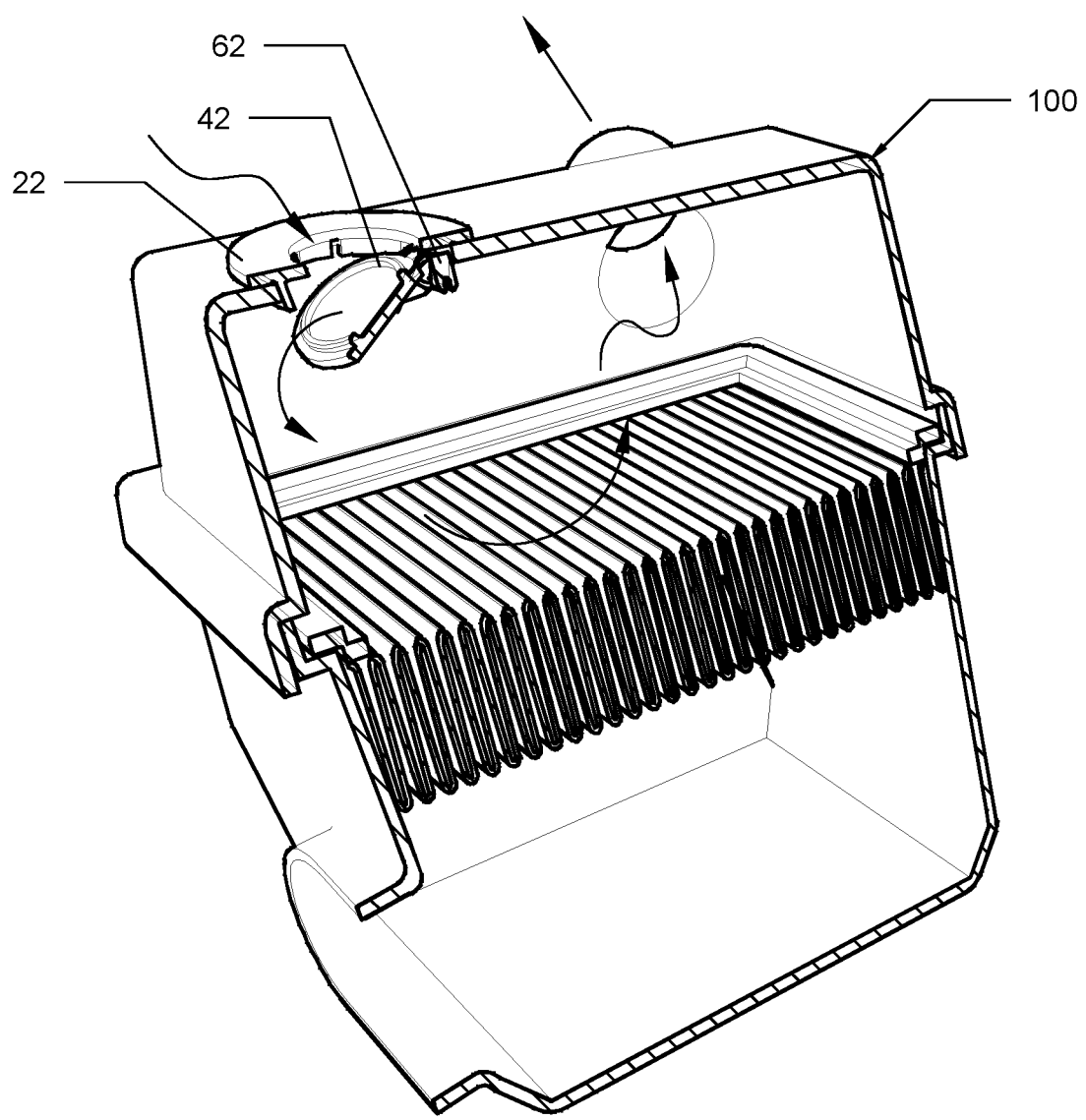
FIG. 6 represents an isometric cross-sectional view of the present invention 10 when coupled at the top side of the engine air filter housing 100, wherein air is allowed to flow towards the intake of the car engine when the cap 42 is opened.

FIG. 1 depicts the engine air filter housing 100 when water enters inside thereof, it is well-known that water may damage the engine of a vehicle if enters to the combustion chamber, thereby FIG. 6 illustrates the cap 42 being opened by means of the air intake pressure needed to achieve a proper combustion, wherein said air intake pressure may be lower than the weight of the water volume at the bottom of the engine air filter housing 100 to prevent suctioning water towards inside the engine, thereby the intake pressure may be taken from the opening 26 when the cap is opened, as FIG. 6 illustrates, wherein the cap 42 when opening may actuate the audible alarm and/or visual alarm by means of the microswitch electrically connected to the electric system of the vehicle to alarm the user when water entered inside the engine air filter housing 100.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A valve with a rotating cap, comprising:
   a frame assembly including a frame, an extended portion, an opening, stoppers, holders with central openings hereinafter termed as knuckles, and top supports, wherein the frame is a rounded element with said opening in a centered portion thereof, said extended portion extends past a portion of a bottom side of said frame, said stoppers are supports placed along said extended portion, said knuckles are joints placed on said bottom side of said frame that includes transversal openings, said top supports extend past a top portion of said frame, wherein said top supports are perpendicular walls; wherein said top supports include a gap therebetween that is adapted to hold a microswitch
   a cover assembly having said cap, a support, and a support opening, wherein said cap is a rounded flat element that is configured to abut against a portion of said frame, wherein said support is integrally formed with said cap, said support includes in an edge thereof said support opening; wherein said cap is pressing a lever of said microswitch allowing to activate an audible alarm when said cap is opened; and
   a pivot assembly including a spring and a pin, wherein said spring is configured to receive said pin and said pin is configured to be inserted into said support opening.

2. The valve with the rotating cap of claim 1, wherein said frame, said extended portion, said opening, said stoppers, said knuckles and said top supports are formally integrated therebetween, conforming thereby a solid element.

3. The valve with the rotating gap of claim 1, wherein said extended portion conforms a peripheral wall around a bottom portion of said frame.

4. The valve with the rotating cap of claim 1, wherein said stoppers have a curved side that conforms to a curved peripheral wall of said extended portion.

5. The valve with the rotating cap of claim 1, wherein said knuckles include a gap therebetween.

6. The valve with the rotating cap of claim 1, wherein said cap has a bigger diameter than said opening of said frame, and a smaller diameter than said extended portion.

7. The valve with the rotating cap of claim 1, wherein said cap when abutting against said frame creates a hermetic seal therebetween.

8. The bar-bel valve with the rotating cap of claim 1, wherein said support has a slanted transition towards a central portion of said cap.

9. The valve with the rotating cap of claim 1, wherein said support opening is concentrically placed with respect to said openings of said knuckles.

10. The valve with the rotating cap hand-grip of claim 1, wherein said spring has horizontal bars with a transitional spiral on each bar that joins into a perpendicular section, creating a spring-loaded mechanism.

11. The valve with the rotating cap of claim 1, wherein said pin is a cylinder that is adapted to be inserted through said transitional spiral, said support opening and said openings of said knuckles to hold in place said cap into said frame.

12. A valve with a rotating cap, consisting of:
- a frame assembly including a frame, an extended portion, an opening, stoppers, holders with central openings hereinafter termed as knuckles, and top supports, wherein the frame is a rounded element with said opening in a centered portion thereof, said extended portion extends past a portion of a bottom side of said frame, said stoppers are supports placed along said extended portion, said knuckles are joints placed on said bottom side of said frame that includes transversal openings, said top supports extend past a top portion of said frame, wherein said top supports are perpendicular walls, wherein said frame, said extended portion, said opening, said stoppers, said knuckles and said top supports are formally integrated therebetween, conforming thereby a solid element, said extended portion conforms a peripheral wall around said bottom portion of said frame, said stoppers have a curved side that conform a curved peripheral wall of said extended portion, wherein said knuckles include a gap therebetween, wherein said top supports include a gap therebetween that is adapted to hold a microswitch or the like;
- a cover assembly having said cap, a support, and a support opening, wherein said cap is a rounded flat element that is configured to abut against a portion of said frame, wherein said support is integrally formed with said cap, said support includes in an edge thereof said support opening, wherein said cap has a bigger diameter than said opening of said frame, and a smaller diameter than said extended portion, said cap when abutting against said frame creates a hermetic seal therebetween, said support opening is concentrically placed with respect to said openings of said knuckles, said spring has horizontal bars with a transitional spiral on each bar that joins into a perpendicular section, creating a spring-loaded mechanism, said cap is pressing a lever of said microswitch allowing to activate and audible alarm when said cap is opened; and
- a pivot assembly including a spring and a pin, wherein said spring is configured to receive said pin and said pin is configured to be inserted into said support opening, wherein said spring has horizontal bars with a transitional spiral on each bar that joins into a perpendicular section, creating a spring-loaded mechanism, wherein said pin is a cylinder that is adapted to be inserted through said transitional spiral, said support opening and said openings of said knuckles to hold in place said cap into said frame.

* * * * *